United States Patent [19]

Crane

[11] 4,331,424
[45] May 25, 1982

[54] MATH EDUCATIONAL APPARATUS

[76] Inventor: Jane L. Crane, 1541 Winding Waye La., Wheaton, Md. 20902

[21] Appl. No.: 206,278

[22] Filed: Nov. 12, 1980

[51] Int. Cl.³ .............................................. G09B 19/02
[52] U.S. Cl. .................................... 434/208; 434/210; 235/123
[58] Field of Search .............. 434/205, 210, 189, 204, 434/208; 235/123

[56] References Cited

U.S. PATENT DOCUMENTS

| | | | |
|---|---|---|---|
| 39,740 | 9/1863 | Miller | 434/210 X |
| 2,463,763 | 3/1949 | Graff | 235/123 |
| 2,875,529 | 3/1959 | Cornelius | 434/208 |
| 3,455,033 | 7/1969 | Han | 434/208 |
| 3,872,610 | 3/1975 | Dumovich | 434/189 |
| 3,908,287 | 9/1975 | Darnell | 434/210 X |
| 4,006,344 | 2/1977 | Schutte | 434/189 X |

*Primary Examiner*—William H. Grieb
*Attorney, Agent, or Firm*—Thomas E. Beall, Jr.

[57] ABSTRACT

An educational device for teaching place values in a base N number system, and regrouping between places. The device has a plurality of workpieces, a support base, partitions on the base to form a plurality of parallel chambers of a length to stack at least N workpieces, and a storage container. Each chamber has a transfer element and an inlet and outlet to transfer workpieces from one chamber to an adjacent chamber and to the storage container.

20 Claims, 5 Drawing Figures

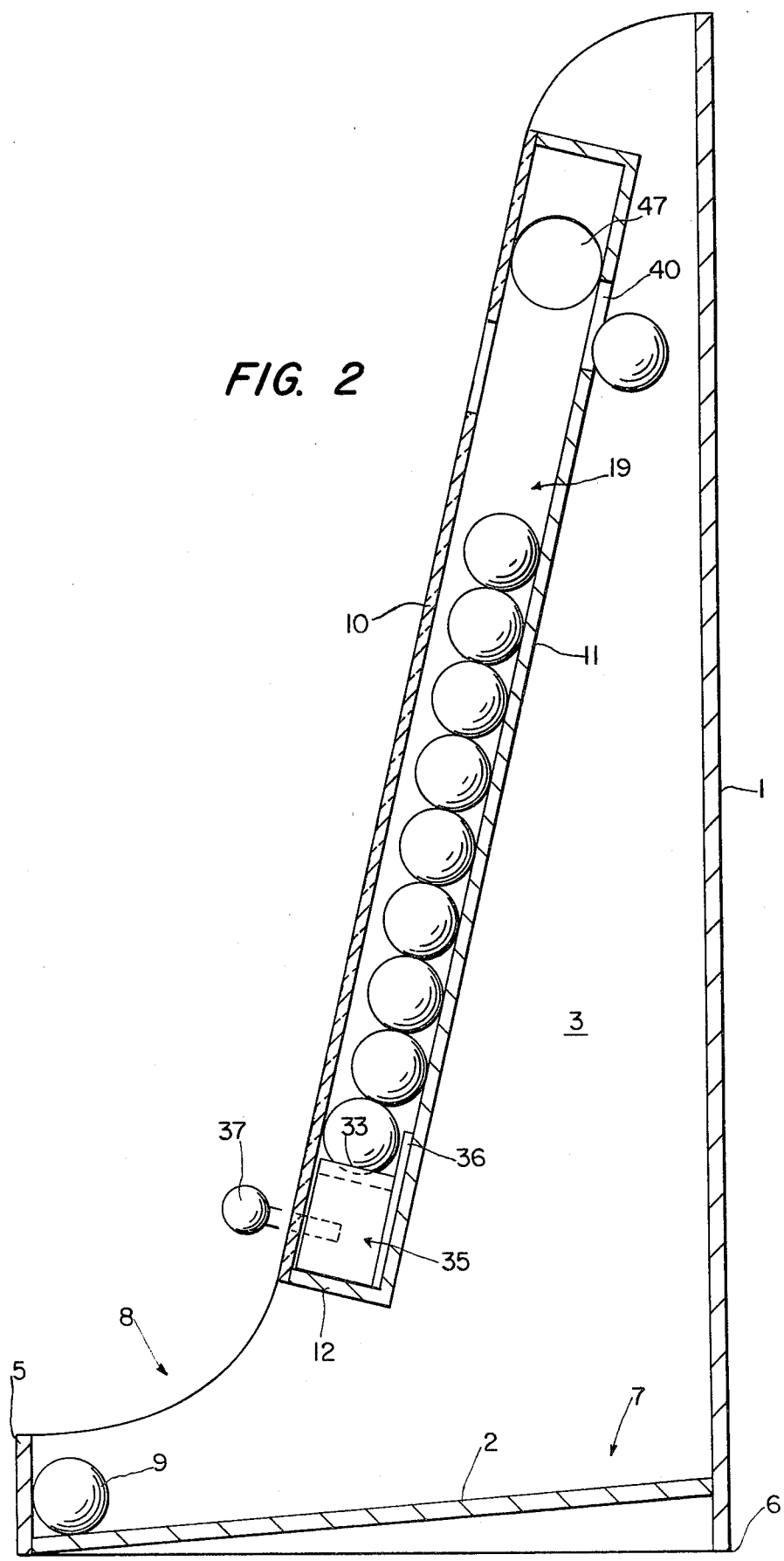
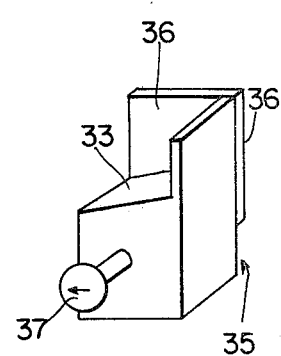
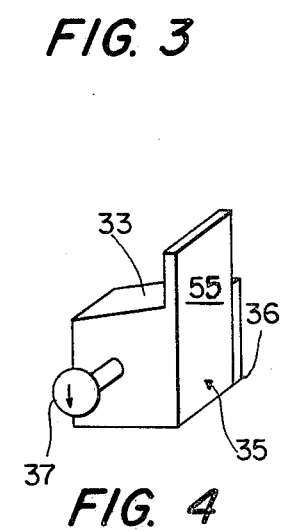
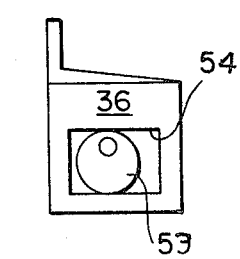
FIG. 2
FIG. 3
FIG. 4
FIG. 5

MATH EDUCATIONAL APPARATUS

BACKGROUND OF THE INVENTION

The present invention relates to an educational device or toy, particularly useful in teaching a number system, particularly the base 10 number system, to people, particularly children.

The base 10 number system contains only four concepts: the use of the digits 0-9; the idea of place, that is, as you move one place to the left a digit is ten times the value of the same digit one place to the right; the concept of zero, that is, a valueless, but very meaningful place holder; and finally, the most difficult, that is, the concept of the "tens changing process" (regrouping as taught in first grade beginning approximately in 1960). In the "tens changing process", when 10 units are accumulated in any one given place, they are evenly exchanged for one unit in the next higher place. Ten 1's are exchanged for one 10; ten 10's are exchanged for one 100, etc.

The above four concepts serve only to make manipulation of numbers easier although most five to nine year olds wouldn't agree nor would their parents struggling over their childrens' "new math" text. The usefulness of these concepts and how they relate can be illustrated with the following story.

Long ago, in ancient Babylon, there lived a wise and very wealthy shepherd named Count Tenio. He kept count of his huge herd of sheep by putting a pebble in a large urn each time a lamb was born or bought and removed a pebble from the urn when one of his sheep died. But, although he knew he had a gigantic herd he couldn't tell exactly how many sheep there were because he couldn't count—the number system hadn't been invented.

Soon, Count Tenio suspected that his helpers were stealing sheep from him—just a few at a time but he couldn't say for sure because he really didn't know how many sheep he had. That urn of pebbles wasn't helpful either; although he knew there were many pebbles, he couldn't count them.

He decided he would sue his helpers in a court of law. But they and he knew he would lose his case, because he had no evidence of exactly how many sheep he had. Count Tenio solved his problem—he invented the number system. He still used pebbles but this time not so many.

That night while his sheep slept he stole into the barn and this is what he did. He lined up five urns and he started filling them with pebbles, one for each sheep, only no urn contained more than his fingers worth of pebbles—each time he reached his fingers worth he exchanged all the pebbles for one pebble which he put in the urn to the left. When that urn had his fingers worth of pebbles he took them all out and put one pebble in the next urn to the left.

At this point, he realized he had better label those urns so everyone would understand what they meant. The urn on the far right had the least value—each pebble stood for only one sheep—this he called the ones' urn. In the urn to the left of the ones' urn each pebble stood for his fingers worth of sheep or one pebble in this urn stood for the whole ones' urn. He called this the tens' urn. In the urn to the left of the tens' urn each pebble was worth one tens pebble; this he called the hundreds' urn. And finally, the urn to the left of the hundreds' urn was the thousands' urn; each pebble in the thousands' urn was equal to his fingers worth of pebbles in the hundreds' urn.

Next he decided that his fingers worth was too inexact; he needed something to stand for each finger so he designed numerals to stand for each finger; 1, 2, 3, 4, 5, 6, 7, 8, 9. Since all his fingers would be equal to one pebble in the next left urn he let that be a 1 again but put a 0 to the right of it to show everyone that pebble was in the tens' urn—the one to the left of the ones' urn. The 0 stood for an empty urn but showed that in a number system that relies on place an empty urn is just as important as one with a pebble in it. The hundreds' urn had a 1 for the pebble in the hundreds' urn and a 0 for no pebbles in the tens' urn and 0 for no pebbles in the ones' urn. With those two 0's everyone would know where that one pebble was. Zeros as place holders would enable him to show a difference between one sheep and many by just using one pebble.

That first night Count Tenio counted 6 thousands, 8 hundreds, 4 tens and 7 ones sheep. He didn't tell anyone about his new counting method. The next night using his new system he counted again. Aha! He was right—this time he had 6 thousands, 8 hundreds, 4 tens and 1 sheep. Six sheep had been stolen. Just as he suspected. The following night his count came to 6 thousands, 8 hundreds, 3 tens and 2 ones sheep. Altogether 1 tens and 5 ones worth of sheep had been stolen (we would say 15). With the old method he never would have detected his loss, but now he knew for sure.

The following day he went to court and won his case. The three thieves said they thought he'd never be able to count the missing sheep.

Not only did the shepherd win his case, but for the rest of time Count Tenio's number system, the base 10 number system, has been used by mankind to keep track of numbers of things.

U.S. Pat. No. 3,455,033, to Bing-Hou Han, discloses an educational device, which is useful in teaching the number system. A ball calculator employs upper and lower registers with ten keys as shown in FIG. 11, which control the flow of marbles through the channels. Carrying can be employed, for example when adding.

U.S. Pat. No. 2,463,763 to Graff shows a ball computing apparatus which teaches the idea of carrying, but the carrying is done manually rather than automatically. Different colored balls are used to show the need for carrying.

The above two devices, while useful, are difficult to use and require considerable explanation as to their proper use, which seriously hinders their use in teaching children or others unfamiliar with the number system.

U.S. Pat. No. 3,908,287 to Darnell is a visual aid in teaching mathematics, but is not easily understood by beginning students and not sufficiently interesting to hold the attention span of children for very long.

SUMMARY

The present invention is a device that is both educational as visual teaching aid for mathematics and highly enjoyable as a toy so as to hold the attention span of children while they are learning. A preferred embodiment of the present invention is with respect to teaching the base 10 number system, although further embodiments are contemplated for other number systems.

The present invention is similar to the line-up of urns used by Count Tenio, but has considerable improvements with respect to economy, compactness of arrangement, ability to visualize, automatic carrying and interest in using.

The device of the present invention is an educationally valuable and highly motivating teaching aid or toy that can teach a child, in the process of play, the essential structure of a number system, particularly the base 10 number system.

Children are mesmerized by rolling motion and the clacking noise of marbles. Child-manipulated machines with their moving parts made visible fascinate youngsters. A child will be attracted and the interest will be held during the teaching process of learning easily the basic concepts of the number system. The present invention combines the basics of new math and old math, as they are presently known, to teach two very old subjects, namely, addition and subtraction.

Carrying the anology to Count Tenio's system of urns, the urns have been replaced by columns narrow enough and tall enough to hold only ten marbles (marbles instead of pebbles) each. Second, instead of having to count the marbles each time, the exact number in each column is visible at a glance; the number is etched in the plastic cylinders into which the child drops the marbles.

There is no guesswork about when to exchange (regroup or carry). Whenever a marble falls into the ten area (preferably of a color that will attract the child's attention, such as red) it's a signal to carry. Carry is exactly what is done in the physical sense, in addition to the mathematical sense. The child lifts the column of ten marbles and all ten marbles spill out into the back where one marble drops into the column next to the left, worth ten times the value of the previous column from which the marbles are being withdrawn (labels are preferably provided on each of the cylinders to identify the places). The tens changing process is automatically carried out and the child knows exactly when to do so. Most importantly, the child can read the number associated with the places and marble positions easily and quickly.

BRIEF DESCRIPTION OF THE DRAWING

Further objects, features and advantages of the present invention will become more clear from the following detailed description of a preferred embodiment, shown in the accompanying drawing, wherein:

FIG. 2 is a cross-sectional view taken along line II—II of FIG. 1;

FIG. 3 is a perspective view of the transfer mechanism in its condition for addition;

FIG. 4 is a perspective view of the transfer mechanism in its condition for subtraction; and FIG. 5 is a rear elevation view of the transfer mechanism of FIG. 4.

DETAILED DESCRIPTION OF A PREFERRED EMBODIMENT

Figure 1:
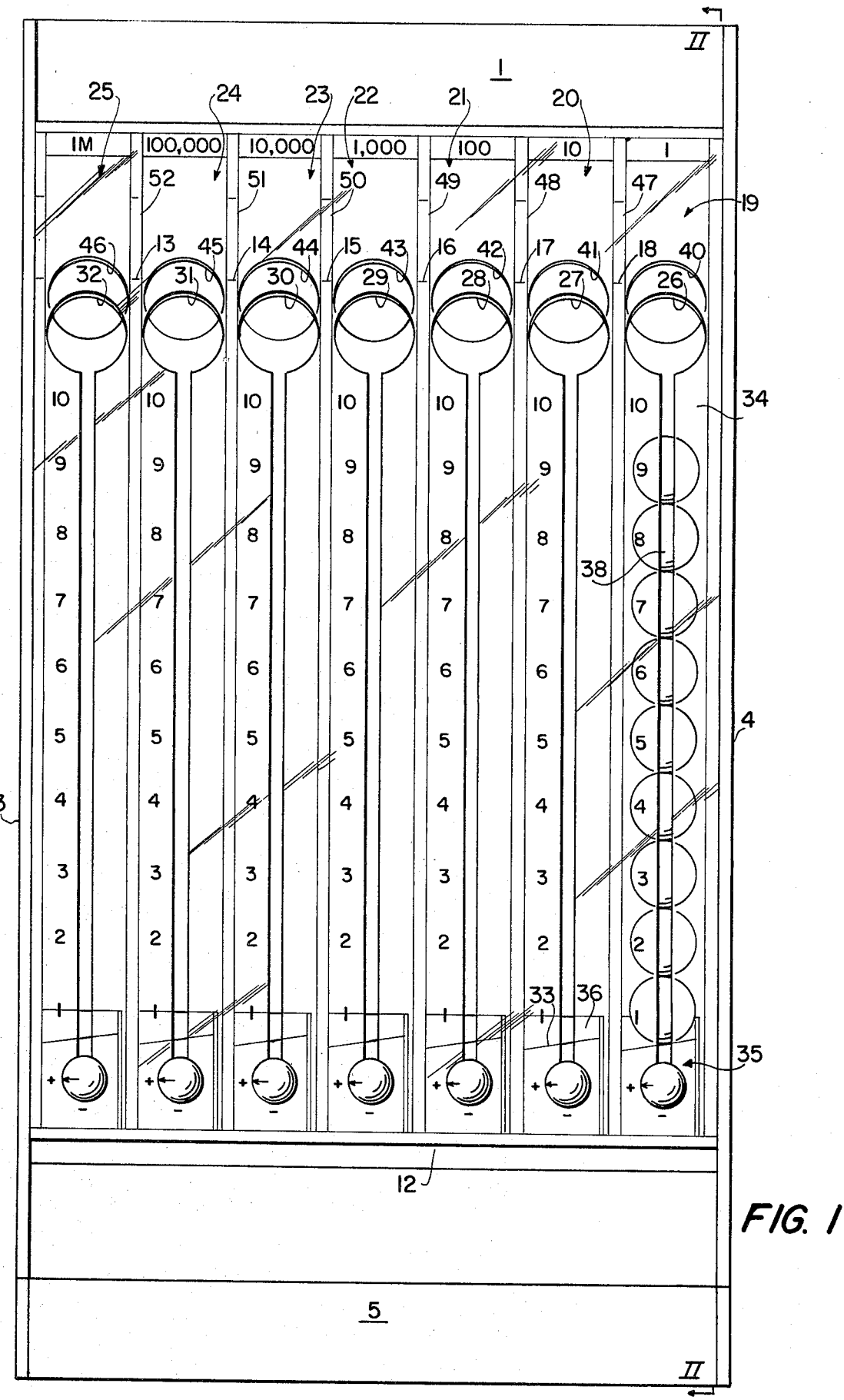
FIG. 1 is a front view of the apparatus.

As shown in FIGS. 1 and 2, the apparatus is set up to function with respect to a number system having the digits 0 to N, more particularly with respect to a number system having the base 10 wherein the digits are 0 to 9.

While the apparatus may be constructed of any material, it is desirable to construct it of synthetic resin, particularly molded synthetic resin or synthetic resin sheets that are cut and thereafter bonded together. In any event, a support base is constructed of a generally vertical back wall 1, a bottom wall 2, opposed side walls 3 and 4, and a front wall 5 that are all rigidly joined together in an integral fashion to rest upon a support surface 6, which may be a table or any other convenient generally horizontal support surface. The base thereby forms a workpiece storage container 7 that is freely accessible through an open area 8 to an operator, so that the operator may pass its hand through the opening 8 and remove any workpieces 9 within the container 7. It is noted that the bottom wall 2 slopes downwardly and to the front, so that the workpieces 9 will be biased towards the front wall 5 to facilitate their removal by the operator.

Each of the workpieces 9 is preferably spherical, although other shapes are contemplated. If other shapes of workpieces are employed, the various apertures mentioned hereinafter would be correspondingly shaped. Most particularly, colored marbles or other decorative types of spheres are preferred.

Since a number system has a plurality of place values, that is corresponding to N, N0, N00, etc., in accordance with the above example, the apparatus of the present invention will have a corresponding plurality of chambers. At least two chambers are required and more are preferred to teach the various place values. In the preferred embodiment, there are provided seven chambers corresponding to the place values 1, 10, 100, 1000, 10,000, 100,000, 1,000,000, all as marked by indicia at the top of each column, for example, 1, 10, 100, etc.

To physically define the above-mentioned chambers, a plurality of partitions are rigidly secured together and to the above-mentioned walls 3, 4. A front partition 10, rectangular in shape and transparent, is secured along its two opposite vertical parallel edges correspondingly to the two vertical side walls 3, 4. It is most preferred that this partition be transparent, so that the operator may actually see the number of workpieces in the various chambers, although it is not critical. It is a matter of choice as to whether or not the remaining structure of the apparatus is or is not transparent. A rear partition 11, of substantially the same shape as the front partition 10, is rigidly secured along its opposite side edges respectively to said side walls 3 and 4 in parallel spaced relationship to said front partition 10. A bottom partition 12 is rectangular in shape and has its opposite sides rigidly secured respectively to said front and rear partitions 10, 11, and its opposite ends respectively rigidly secured to said side walls 3, 4 to thereby form the bottom of the chambers. A plurality of parallel intermediate partitions 13, 14, 15, 16, 17, 18 are secured in parallel, equally spaced increments, between said front and rear partitions 10, 11, to form the individual chambers 19, 20, 21, 22, 23, 24, 25 that are tubular in shape, generally vertically extending, specifically rectangular in cross-section of an effective cross-sectional area sufficiently larger than one workpiece so as to contain a plurality of stacked workpieces therein, and sufficiently smaller than two workpieces so that the stack is effectively formed serially.

It is most preferable that all of the chambers are in a side-by-side parallel array extending in a common plane, as shown, although other configurations are possible, for example the array may be arcuate when viewed in a plan view.

The front partition 10 is provided with a plurality of inlet apertures 26–32 respectively aligned with and leading to the chambers 19–25. Each inlet aperture is of a size sufficient to admit one workpiece, so that the operator may take workpieces from the container 7 and place them into appropriate chambers through the inlet apertures. For example, to represent a count of 1, one workpiece would be placed through the aperture 26, whereas to represent a count of 100, one workpiece would be placed through the aperture 28.

A support surface 33 is provided at the bottom of each chamber, which will be described hereinafter in greater detail. It is seen that from the size of the workpieces and the length of each chamber, that the workpieces resting on the support surface 33 will be serially stacked in positions corresponding to the indicia 1, 2, 3, 4, 5, 6, 7, 8, 9, 10 that are on the front partition 10 to reach the corresponding inlet aperture, so that when ten workpieces are in a chamber, it is effectively full and mathematically full. To indicate this fullness, it is preferable to provide some additional indicia at the "10" level of each chamber, which preferably is provided by a colored transparent band 34, for example red.

There is a mechanism to remove the workpieces from their respective chambers, and one such transfer mechanism 35 is provided in the bottom of each chamber. Since these transfer mechanisms 35 are all preferably identical, only one will be described. The transfer mechanism includes the bottom support wall 33, that is inclined, for a reason to be discussed hereinafter, in one horizontal direction, further provided with a rear upwardly and vertically extending wall 36, and a handle 37 that extends outwardly through a generally vertically extending slot 38 in the front partition to the outside of the apparatus where it may be grasped by an operator to move the transfer mechanism 35 from its bottom illustrated position upwardly to the corresponding inlet aperture, for example 26.

When one of the chambers is full of workpieces, physically and mathematically, that is when it contains ten such workpieces as indicated by the number indicia and the band indicia 34, the operator will grasp the corresponding actuator 37 and move it upwardly under the control of the slot 38 as far as it will go, as determined by the upper limit of the corresponding inlet aperture, for example 26. This upward movement of the transfer mechanism will cause the workpieces that were in the positions 10, 9, 8, 7, 6, 5, 4, 3, 2 to serially and in order pass through an exit aperture 40 that is in the rear partition 11. It is noted from FIG. 2 that each of the partition walls 10, 11, and thus chambers, is rearwardly inclined when viewed from the bottom towards the top so that the workpieces will, by gravity, rest against the rear partition 11 so as to pass by gravity out of the exit aperture 40. As seen from FIG. 1, exit apertures 40, 41, 42, 43, 44, 45, 46, are respectively provided in the rear partition for the chambers 19, 20, 21, 22, 23, 24, 25. Preferably, each of the inlet apertures is vertically spaced below the exit aperture for the same chamber, so that workpieces manually placed in the inlet aperture will not accidentally pass directly through the exit aperture, and due to the above-mentioned inclination, the workpieces will not pass out of the inlet aperture during the upward movement of the transfer mechanism. Further, the wall 36 on the transfer mechanism will prevent the lowermost workpiece, in the position "1" from passing through its adjacent exit aperture, for example 40. When the transfer mechanism 35 reaches the limit of its upward travel, it is so dimensioned that the support surface 33 will have one edge aligned with a transfer aperture in an intermediate partition of the chamber. More specifically, in the chamber 19, the left hand (as viewed in FIG. 1) edge of the support surface 33 will be horizontally aligned with and adjacent the lower edge of a transfer aperture 47 in the intermediate partition wall 18. The other partition walls 17, 16, 15, 14, 13, between adjacent chambers will correspondingly have transfer apertures 48, 49, 50, 51, 52, all of which transfer apertures will be horizontally aligned and vertically spaced above the previously mentioned inlet and exit apertures. The support surface 33 is inclined downwardly and towards the adjacent transfer aperture leading to the adjacent chamber that represents the next highest place value. In the example, the support surface 33 is inclined so that the bottommost workpiece will move by gravity through the transfer aperture 47 into the chamber 20 when the transfer mechanism is at its upper limit of travel.

From the above, it is seen that when, for example, the chamber 19 is mathematically and physically full of workpieces, that is contains ten as indicated by the indicia 34, the transfer mechanism is raised, by grasping the actuator 37 and moving it upwardly to the limit of slot 38 so that serially the workpieces will pass through the exit aperture except for the last workpiece that will pass through the transfer aperture 47 to the next highest place value chamber. It is seen that this is effectively and mathematically what was done by Count Tenio when he removed ten pebbles from one urn and replaced them mathematically by placing one pebble in the next urn to the left, which because of the present apparatus is easily understood, seen and appreciated by a child.

The workpieces that pass through the exit apertures 40–46, will freely fall by gravity downwardly into the container 7, where they will roll by gravity along the inclined bottom wall 2 toward the front wall 5, where they may be used again by the operator.

The above description has been with respect to the apparatus used for performing addition. This apparatus may be used also for the performance of subtraction. In this respect, reference is made to FIGS. 3 and 4. In FIG. 3, the transfer mechanism 35 is shown with its back wall 36 in position to prevent the last or bottommost workpiece from passing through the exit aperture 40. This wall 36 is mounted for movement with respect to the remainder of the transfer mechanism 35, in a vertical direction between its extended position shown in FIG. 3 and its retracted position shown in FIG. 4. In its retracted position of FIG. 4, all the workpieces pass through the exit aperture 40 when the transfer mechanism is raised. To move the wall 36 between its two positions, the actuator 37 is rotatably mounted within the transfer mechanism 35, and has at its rear an eccentrically mounted cam 53, which is received within a follower aperture 54 within the movable rear wall 36. It is therefore seen that by rotation of the actuator 37 through 90 degrees, corresponding rotation of the cam 53 within the cam follower aperture 54 will move the wall plate 36 between its two positions. To subtract a smaller number from a larger number, you simply shift the transfer mechanism to the position shown in FIGS. 4 and 5 and count as the desired number of workpieces pass through the exit aperture during raising of the transfer mechanism in the appropriate chamber. To subtract a larger number from a smaller number, a workpiece from a column adjacent in the direction of increased place is borrowed or regrouped, that is removed by upward movement of the transfer mechanism and then ten workpieces are inserted into the chamber to the right of the one having the workpiece removed.

As seen in FIGS. 3, 4, and 5, the transfer mechanism can include a side wall 55, which will prevent workpieces from passing through the wrong transfer aperture, which function is also performed by the inclined support surface 33.

While a preferred embodiment of the present invention has been specifically illustrated, further embodiments, modifications and variations are contemplated according to the broader aspects of the present invention, all as determined by the spirit and scope of the following claims.

What is claimed is:

1. Educational apparatus used as a visual aid in the teaching of mathematics, with respect to a base N number system having the digits 0–N, place values of N, N0, N00, etc., and regrouping between places, comprising:
    a plurality of substantially identical separate workpieces;
    a support base;
    partitions mounted on said support base and rigidly interconnected to thereby form a plurality of substantially parallel, at least partially vertically extending, tubular chambers extending in a side-by-side array adjacent each other;
    each chamber having a cross-sectional area transverse to its length larger than the corresponding cross-sectional area of each workpiece and smaller than the cross-sectional area of two adjacent workpieces so that the workpieces will only stack serially in each chamber, means at the lower end of each chamber to close said chamber, to prevent the escape of workpieces from the lower end of the chamber;
    each chamber being of a length sufficient to serially stack at least N workpieces;
    a workpiece storage container secured to said support base spaced from said columns;
    a transfer means within each of said chambers movable from the lower end to the upper end of its respective chamber, being of a size sufficient to drive any workpieces within its chamber for movement therewith, and having an actuator extending outside of said chamber to be manually grasped;
    inlet means at the top of each chamber providing free access of workpieces to the chamber, so that an operator may serially place workpieces in the upper end of each of said chambers to be added to the top of the stack of workpieces already in the chamber;
    means at the upper end of at least some of said chambers for transporting one workpiece to a specific adjacent chamber; and
    means for discharging the other workpieces through an exit aperture in the chamber to said storage container when said workpieces are moved upwardly in said chamber by movement of said transfer means from its lower position to its upper position.

2. The apparatus of claim 1, wherein each of said workpieces is a sphere.

3. The apparatus of claim 1, wherein all of said chambers are aligned in a single plane, and each includes at least one partition in a plane common with corresponding partitions of the other columns, which are all transparent.

4. The apparatus of claim 3, wherein the common plane of said chambers is at an acute angle with respect to the vertical when said base is supported on a horizontal surface, and said discharging means includes the exit aperture in a partition opposed to said transparent partition immediately vertically above said storage container with a free fall vertical path therebetween, and said discharge aperture being of a size larger than one workpiece.

5. The apparatus of claim 4, wherein each said inlet means includes an aperture in said one transparent partition and vertically spaced below said exit aperture, and of a size larger than one of said workpieces.

6. The apparatus of claim 5, including indicia means spaced above the bottom of each chamber a distance equal to N stacked workpieces in each said chamber to indicate when the column is mathematically full.

7. The apparatus of claim 6, wherein each of said chambers is inclined with respect to the vertical so that a workpiece in a chamber aligned with the inlet means will rest against the opposite partition wall and not exit from the inlet means, and a workpiece within the chamber aligned with the exit aperture will by gravity pass through the exit aperture to the storage container.

8. The apparatus of claim 7, wherein adjacent chambers have a common partition wall, and said transfer means including a transfer aperture larger than one workpiece in said common partition wall and vertically above said exit aperture; and
    said transfer means having an upwardly extending wall adjacent said rear wall of a length sufficient to prevent only one workpiece from passing through the exit aperture so that only the one workpiece will be carried upwardly to exit through said transfer aperture.

9. The apparatus of claim 8, wherein there are at least three chambers, and one chamber having chambers on each of its sides and correspondingly having two opposed common partition walls, and further having its transfer means including means for passing said one workpiece, the lowermost workpiece, through only the transfer aperture leading to the next highest place value chamber.

10. The apparatus of claim 9, wherein said means for passing is an inclined support surface on the transfer means engaging said one workpiece to bias said one workpiece, by gravity, towards said one transfer aperture leading to the next highest place value chamber.

11. The apparatus of claim 1, including indicia means spaced above the bottom of each chamber a distance equal to N stacked workpieces in each said chamber to indicate when the column is mathematically full.

12. The apparatus of claim 1, wherein each of said chambers is inclined with respect to the vertical so that a workpiece in a chamber aligned with the inlet means will rest against the opposite partition wall and not exit from the inlet means, and a workpiece within the chamber aligned with the exit aperture will by gravity pass through the exit aperture to the storage container.

13. The apparatus of claim 12, wherein adjacent chambers have a common partition wall and said transfer means including a transfer aperture larger than one workpiece in said common partition wall and vertically above said exit aperture; and
    said transfer means having an upwardly extending wall adjacent said rear wall of a length sufficient to prevent only one workpiece from passing through the exit aperture so that only the one workpiece will be carried upwardly to exit through said transfer aperture.

14. The apparatus of claim 13, wherein there are at least three chambers, and one chamber having chambers on each of its sides and correspondingly having two opposed common partition walls, and further having its transfer means including means for passing said one workpiece, the lowermost workpiece, through only the transfer aperture leading to the next highest place value chamber.

15. The apparatus of claim 14, wherein said means for passing is an inclined support surface on the transfer means engaging said one workpiece to bias said one workpiece, by gravity, towards said one transfer aperture leading to the next highest place value chamber.

16. The apparatus of claim 9, wherein said last means for passing is a side wall on the transfer means engaging said one workpiece to block said one workpiece from moving through the transfer aperture leading to the next lowest place value chamber.

17. The apparatus of claim 16, wherein said means for passing further includes an inclined support surface on the transfer means engaging said one workpiece to bias said one workpiece, by gravity, towards said one transfer aperture leading to the next highest place value chamber.

18. The apparatus of claim 8, wherein said transfer means wall is mounted for vertical movement with respect to the remainder of said transfer means between said previously mentioned position and a second position freely permitting the workpiece resting on the transfer means to pass through said exit aperture.

19. The apparatus of claim 9, wherein said transfer means wall is mounted for vertical movement with respect to the remainder of said transfer means between said previously mentioned position and a second position freely permitting the workpiece resting on the transfer means to pass through said exit aperture.

20. The apparatus of claim 1, wherein said transfer means includes a wall movably mounted with respect to the remainder of said transfer means, for movement between an upper position blocking movement of said one workpiece through said exit aperture for performing addition and a second lower position with respect to the remainder of said transfer means that will freely permit passage of said one workpiece through said exit aperture for subtraction.

* * * * *